(12) United States Patent
Martin

(10) Patent No.: US 7,286,049 B2
(45) Date of Patent: Oct. 23, 2007

(54) METHOD AND SYSTEM OF RE-DIRECTING AND BACKING UP SECURITY SYSTEM DATA AT A RECEIVER

(75) Inventor: Christopher D. Martin, Plainview, NY (US)

(73) Assignee: Honeywell International, Inc., Morristown, NJ (US)

( * ) Notice: Subject to any disclaimer, the term of this patent is extended or adjusted under 35 U.S.C. 154(b) by 128 days.

(21) Appl. No.: 11/089,766

(22) Filed: Mar. 25, 2005

(65) Prior Publication Data

US 2006/0220831 A1    Oct. 5, 2006

(51) Int. Cl.
*G08B 29/00* (2006.01)

(52) U.S. Cl. .................... 340/507; 340/531; 340/506; 340/508; 340/2.7

(58) Field of Classification Search ............ 340/531, 340/506, 507, 508, 539.1, 3.43, 3.44, 3.1, 340/3.2, 2.7; 379/41, 40, 33, 39, 42
See application file for complete search history.

(56) References Cited

U.S. PATENT DOCUMENTS

| | | | | |
|---|---|---|---|---|
| 4,012,728 A | * | 3/1977 | Fowler | 340/508 |
| 5,185,779 A | * | 2/1993 | Dop et al. | 379/33 |
| 5,327,478 A | * | 7/1994 | Lebowitz | 379/40 |
| 6,614,884 B2 | * | 9/2003 | Jang | 379/41 |
| 6,825,762 B2 | * | 11/2004 | Giacopelli et al. | 340/531 |

* cited by examiner

*Primary Examiner*—Anh V. La
(74) *Attorney, Agent, or Firm*—Scully, Scott, Murphy & Presser, P.C.

(57) ABSTRACT

A monitoring system having a plurality of receivers connected to at least one other receiver such that data can be transmitted from a primary receiver to a backup receiver if a data path to an automation computer or to its printer is down. The system programs a primary data path and at least one backup data path. The system detects an error in the primary data path and determines if a backup receiver's data path is operational. The system automatically transmits data received by a primary receiver to a pre-selected backup receiver based upon an error flag. This allows for each receiver to process calls even though its primary path to the automation system or printer is down or malfunctioning.

28 Claims, 5 Drawing Sheets

METHOD AND SYSTEM OF RE-DIRECTING AND BACKING UP SECURITY SYSTEM DATA AT A RECEIVER

FIELD OF INVENTION

The invention relates generally to a monitoring system including a central monitoring station having a plurality of receivers that receive information from a number of different security systems at different locations wherein the receivers are connected to an automation system and printer. More specifically, the invention relates to a monitoring system receiver being connected with multiple receivers such that if a receiver loses connection to its automation system and printer, the data is not lost or isolated from the remaining receivers and automation system.

BACKGROUND

Security systems, such as for homes and businesses, have become commonplace as people seek to protect themselves and their property. A security system includes any life, safety, and property protection system. The security system typically includes a central control panel that communicates with a number of sensors via a wired or wireless path. The control panel has the ability to notify local emergency services and/or a remote monitoring station of an alarm condition via a telephone dialer to the remote monitoring facility or local emergency services. The dialer is typically integrated with the control panel and activated by the control device. However, the dialer can be a separate stand alone device.

A communication network device, such as a modem, allows the control panel to send and receive information via a communication link to a communication network. The communication network is usually a telephone network and the communication link is a telephone line, however, the control panel can also send and receive information via a computer network, such as the Internet. The computer network may include a DSL or cable modem and a network interface card, for example. In addition, a dial-up telephone connection may be used. Other communication paths such as a long-range radio or a cellular telephone link can be used.

The central monitoring station is staffed with operators to monitor incoming communications and to determine when an alarm is set by a monitored security system. The operator contacts emergency services such as fire or police personnel in the appropriate municipality by telephone to report the alarm.

In response to a received message, the central monitoring station processes the message and performs the necessary response. The messages from the respective security systems may include identifiers that identify the security systems.

The central monitoring station includes receivers and transmitters for communicating with different security systems via one or more networks. The receivers receive messages via a communication link from the local individual security systems. Each receiver is connected to an automation system. The automation system is typically an automation computer. The receivers are connected to the automation computer by an automation computer port.

Additionally, each receiver is connected to a printer such that the data the receiver receives can be printed for the operator. Each receiver is connected to its printer via a printer port and a printer cable.

However, there is a need for each receiver to be able to transmit data to the automation computer or print its data on a printer if its primary path to the printer or automation computer is malfunctioning or the port is down, the printer is broken, or cable is lost. For example, if the primary path to the automation system is down, the data received by the receiver will be trapped in the receiver because the data cannot be transmitted to the automation system for processing. Some receivers include multiple ports. One of these ports can be configured for an automation backup. However, a secondary connection from each receiver to the automation system would be required. This may cost additional money for the additional ports and connection. Therefore, there is a need to have a low cost means to transmit data to an automation system or printer if a malfunction or disconnection occurs.

BRIEF SUMMARY OF THE INVENTION

The present invention describes a solution that allows the receiver to be able to connect to the automation system or to a printer, even if its primary path has been blocked, has malfunctioned, or is down.

According to the invention, a monitoring system includes a plurality of receivers, each of the receivers being connected to a plurality of local security systems. The monitoring system further includes an automation computer connected to the plurality of receivers for processing data received by the plurality of receivers. The monitoring system also includes a plurality of printers, each individually connected to one of the plurality of receivers. The monitoring system further contains a means for linking two or more of the plurality of receivers together such that data can be transmitted between each of the linked plurality of receivers. In order to provide the above described linking, the monitoring system has at least one primary data path for each of the plurality of receivers and at least one backup data path for each of the plurality of receivers. Furthermore, the monitoring system includes means for determining a status of each primary data path and a means for automatically switching from the primary data path to one of the backup data paths based upon the status of the primary data path. The monitoring system automatically switches the primary data path to one of the backup data path when there is an error in the primary data path.

The primary data path is a connection between the automation computer and a receiver. Additionally, the primary data path is a connection between one of said plurality of printers and the receiver.

The monitoring system further includes means for detecting the error in at least one primary data path and means for setting an error flag based upon detecting the error. The error flag is displayed on a display of a receiver corresponding to the primary data path. Additionally, the error flag serves as an alarm that notifies an operator of the error. The error flag is automatically transmitted to a backup receiver corresponding to one of the backup data paths. The means for automatically switching includes said error flag.

The monitoring system further includes means for determining the status of each of the backup data paths and a means for selecting a priority order for the backup data paths. The monitoring system determines an order for determining the status of the backup data paths based upon priority order selected by the operator for the backup data paths. The monitoring system automatically transmits the error flag and data to a receiver that corresponds to a first operational backup data path based upon the determining of the status. The error flag is then transmitted to an automation computer to notify the operator via one of said plurality of backup paths.

In another aspect of the invention, a monitoring receiver system includes a means for programming at least one primary data path, means for programming at least one backup data path, means for determining a status of each primary data path, and means for automatically switching from the primary data path to one of the backup data paths based upon the status of the primary data path.

The above and other features of the invention, including various novel details of construction and combinations of parts, will now be more particularly described with reference to the accompanying drawings and claims. It will be understood that the various exemplary embodiments of the invention described herein are shown by way of illustration only and not as a limitation thereof. The principles and features of this invention may be employed in various alternative embodiments without departing from the scope of the invention.

BRIEF DESCRIPTION OF THE DRAWINGS

These and other features, benefits and advantages of the present invention will become apparent by reference to the following text figures, with like reference numbers referring to like structures across the views, wherein.

DETAILED DESCRIPTION OF THE INVENTION

Figure 1:
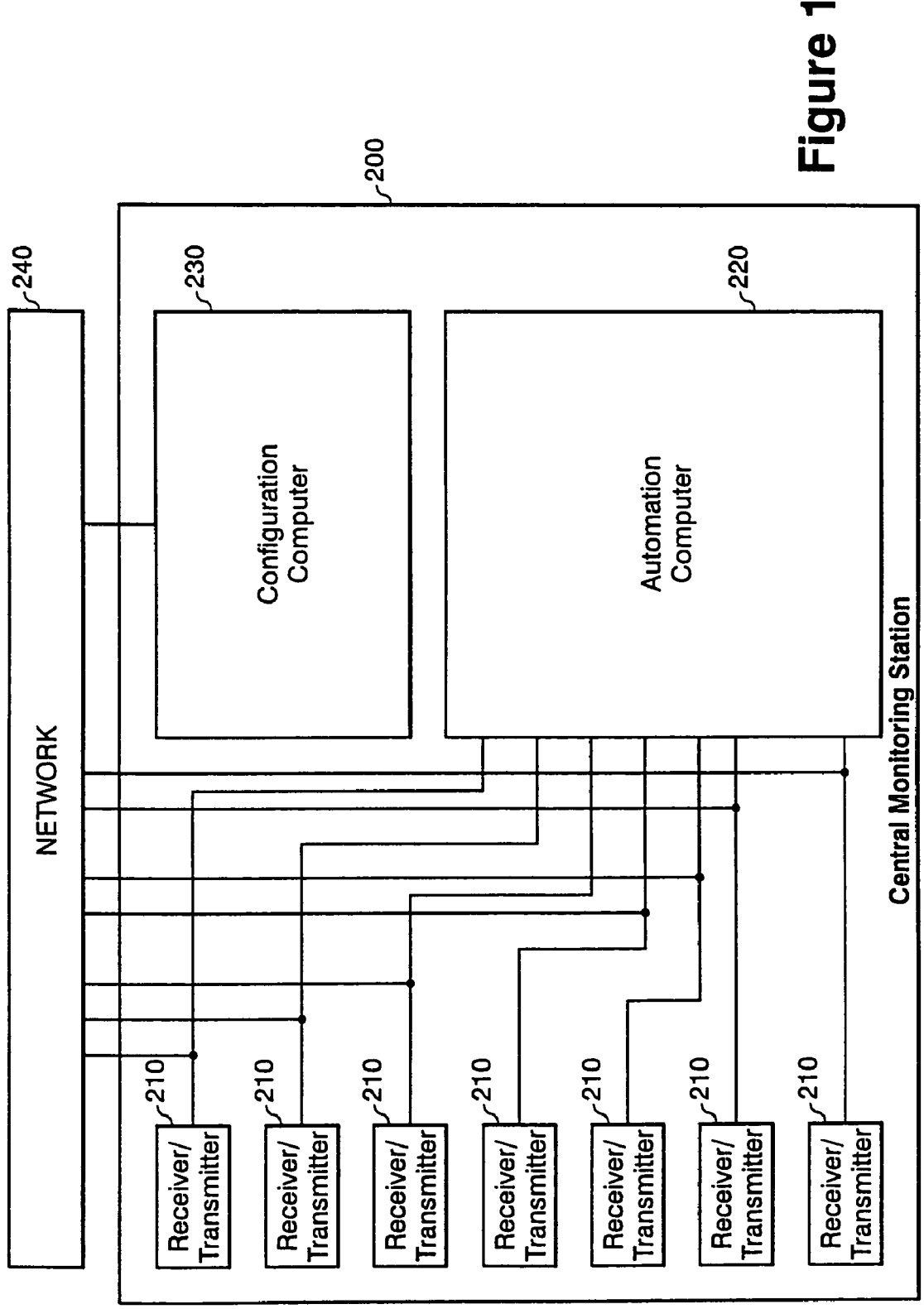
FIG. 1 illustrates a central monitoring station having a plurality of monitoring receivers.

FIG. 1 illustrates a central monitoring station. The central monitoring station 200 can include a configuration computer 230 that is programmed to upload and download local installed security system configurations. The central monitoring station 200 is typically provided at a staffed facility that is remote from the local installed security systems 100 which it serves. The staff at the central monitoring station 200 may monitor the alarm status of the different security systems and take appropriate actions such as notifying emergency personnel when an alarm is tripped.

The central monitoring station 200 is connected to the local installed security system via a network or a communication link 240. The communication link can be any means that allows for bi-directional transmission of data. The communication link 240 can include essentially any type of communication path or paths, including a telephone link, such as a conventional telephone network, to communicate with the local security system. Alternatively, the communication link 240 can include a modem. In another approach, the network 240 includes a computer network such as the Internet. For instance, the local installed security systems may use a communications protocol such as TCP/IP to communicate with the central monitoring station 200. Other communication paths such as satellite or RF radio paths, including, e.g., those using GSM or CDMA techniques may also be used. Moreover, the different local installed security systems may use different communication paths, and upstream communications to the central monitoring station may be on different paths than downstream communication from the central monitoring station 200. In addition, the different communication paths may be attempted serially until a successful communication is made.

The central monitoring station 200 includes plurality of receivers and transmitters 210, for communicating with different local installed security systems via one or more networks. The plurality of receivers and transmitters 210 are connected to at least one automation computer 220. Each receiver has its own communication path or a primary path to the automation computer 220. The receivers are connected to the automation computer 220 via an automation port.

The automation computer 220 collects and processes signals received by the receiver 210 from the local installed security system 100. For example, if one of the motion sensors connected to the control panel at the local installed security system is tripped, the control panel will send a signal via a communication link or network 240 to one of said plurality of receivers 210. This alarm signal is then sent to the automation computer 220 for processing. The user at the central monitoring station 200 monitors the automation computer 220 and coordinates the proper response.

The configuration computer 230 is programmed with software to achieve the desired functionality including instructing the plurality of receivers 210 to recover the periodically updated information and other data from the local installed security systems and to initiate transmissions to the local installed security systems 100.

However, if there is a malfunction in the automation port or in the communication path, the receiver cannot transmit the data received from the local installed security system to the automation computer 220.

Figure 2:
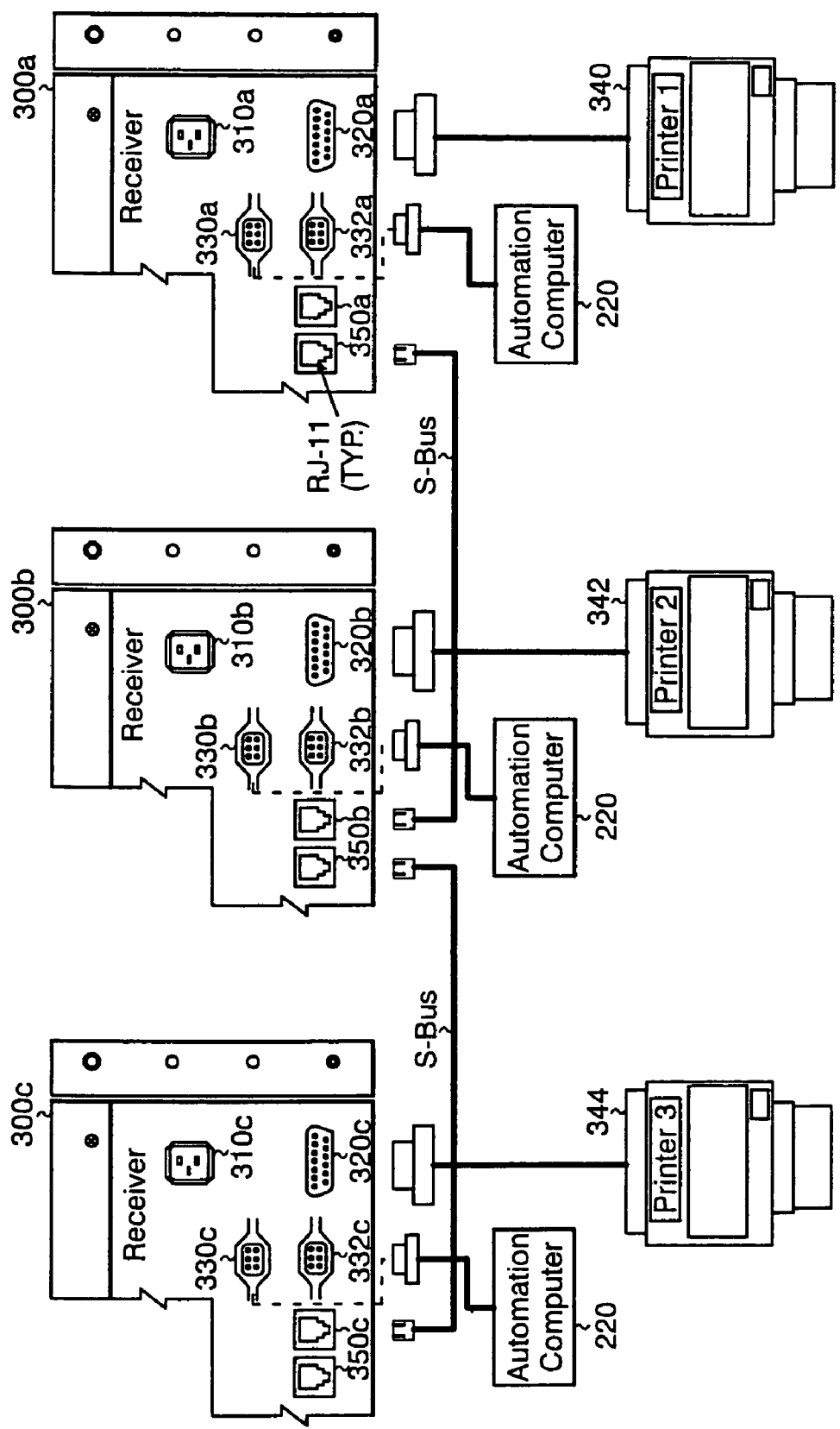
FIG. 2 illustrates an example of three receivers operating when all of the connections are functioning in accordance with the invention.

FIG. 2 illustrates an example of a receiver configuration according to the invention. The receiver configuration shown in FIG. 2 depicts three receivers connected to each other; however, any number of receivers can be connected to each other according to the method of the present invention.

In FIG. 2 each receiver 300a, 300b, 300c, includes a power source input port 310a, 310b, 310c for receiving a power source. Each receiver 300a, 300b, 300c further includes a printer port 320a, 320b, 320c for connecting to each printer 340, 342 and 344 as depicted in FIG. 2 and at least one automation port 330a, 330b, 330c for connecting to the automation computer 220. Receivers 300a, 300b, 300c shown in FIG. 2 have two automation ports 330a, 332a, 330b, 332b and 330c, 332c, respectively; however, the receiver 300a, 300b, and 300c can hold more or less automation ports.

Figure 3:
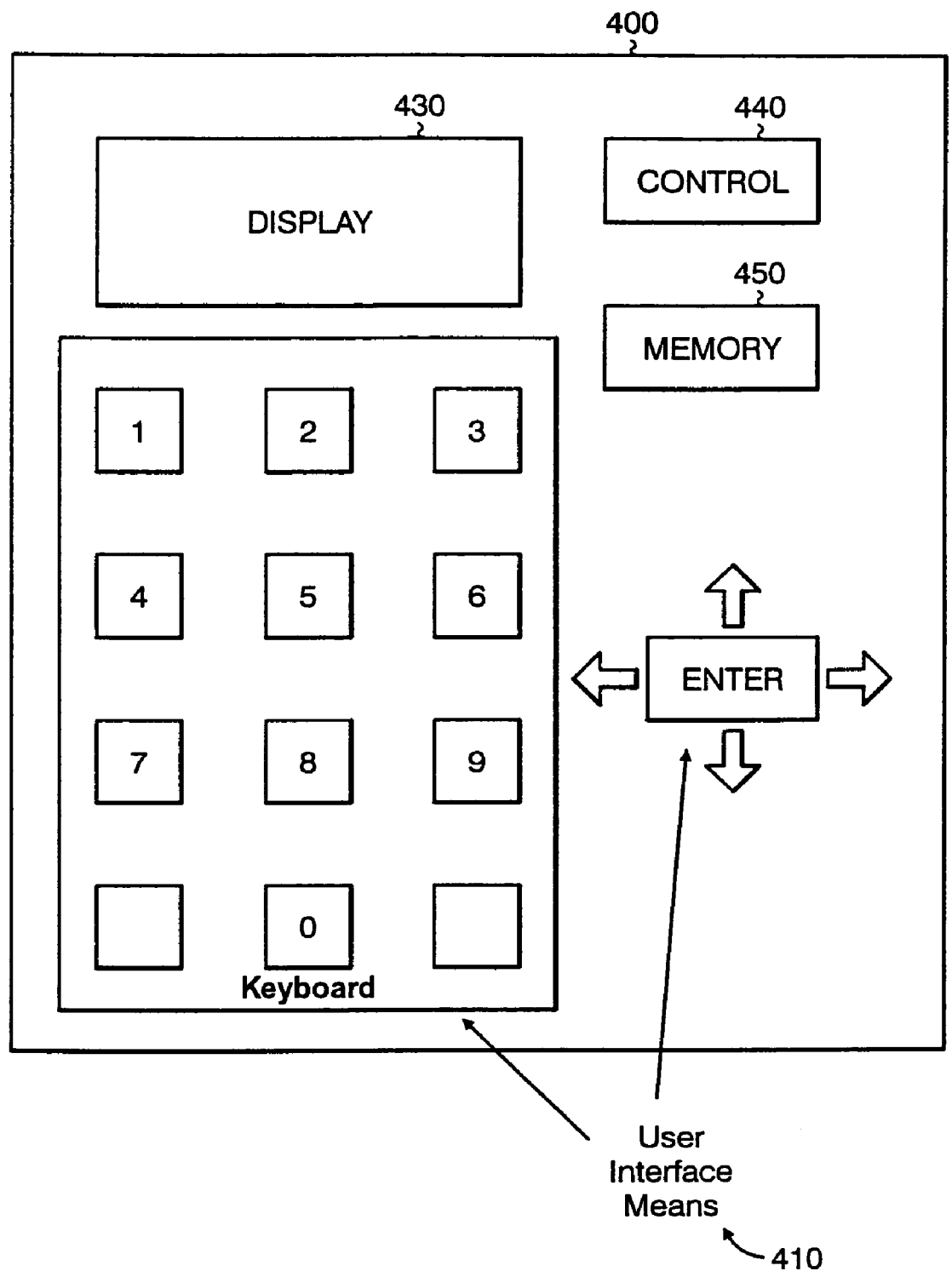
FIG. 3 illustrates a sample receiver according to the present invention.

Additionally each receiver 300a, 300b, 300c contains a pair of communication ports 350a, 350b, 350c. Each receiver 300a, 300b, 300c is connected to each other receiver by one of the pair of communication ports 350a, 350b, 350c using a connection means 360. In FIG. 3 the communication ports are two S-Bus ports, however any communication port can be used with the invention.

In accordance with the present invention, when a receiver's primary automation port or a printer connection is down or malfunctioning or a primary path is down, the receiver has at least one backup path for the data to be transmitted. The configuration according to the present invention always provides a backup path to a printer or to the automation computer 220. Thus, each receiver may continue processing calls even if its primary printer and automation connection are down.

For the example depicted in FIG. 2 there are at least three paths to a printer or the automation system, at least one primary path, and at least two backup paths.

Each receiver must be programmed to be aware that another receiver is linked to it such that the receiver may provide a path to its printer or automation computer 220 if necessary. To accomplish this the operator must program each one of the plurality of receivers 210 with at least one primary path and at least one backup path.

FIG. 3 illustrates a sample receiver according to an illustrative embodiment of the invention. Specifically, receiver 400 has a user interface means 410 located on the front panel 420 of the receiver. The central monitoring station operator will use the user interface means 410 to navigate through a menu tree. The receiver has several menu options listed in the general options menu. The operator will need to select the option which corresponds to the desired option for redirecting or backing-up the receiver 400. For example, the option menu would read "link" or "backup". To select this option the operator will depress the enter button on the user interface means 410. The receiver 400 will then prompt the operator to enter a primary path receiver identifier. Each receiver 400 is assigned a unique receiver identifier that corresponds to each receiver such that each of the plurality of receivers 210 can be distinguished. The receiver identifier will be entered using the user interface means 410 and the identifier will be displayed on a display 430. The receiver 400 will prompt the central monitoring station operator to confirm the identifier based upon viewing the number on the display 430. The operator will have to use the user interface means 410 to confirm the number.

Once the primary path receiver identifier has been entered and confirmed, the operator must then select at least one backup receiver. The display 430 will list a plurality of backup receivers to be assigned. For each backup receiver assignment, the operator will enter the receiver identifier. For example, in FIG. 2 receiver 300a uses its own automation port 330a and printer port 320a as its primary path. Therefore, the operator will enter the receiver identifier that corresponds to receiver 300a as its primary path. As its primary backup, receiver 300a can either have receiver 300b, or receiver 300c based upon the configuration depicted in FIG. 2. A receiver can have as many backup receivers as is linked to the receiver. Accordingly, for its primary backup receiver, the operator would enter either the receiver identifier for receiver 300b or receiver 300c. This process is repeated for each receiver assignment. Once a receiver is assigned, the operator will enter the assignment by using the user interface 420. To enter the receiver identifier into the receiver, the operator depresses the enter button. This will enter the information into the receiver's memory 450 and will allow the operator to select an additional backup receiver by moving to the next line on the display 420. Each receiver can have a plurality of backup data paths.

Figure 4:
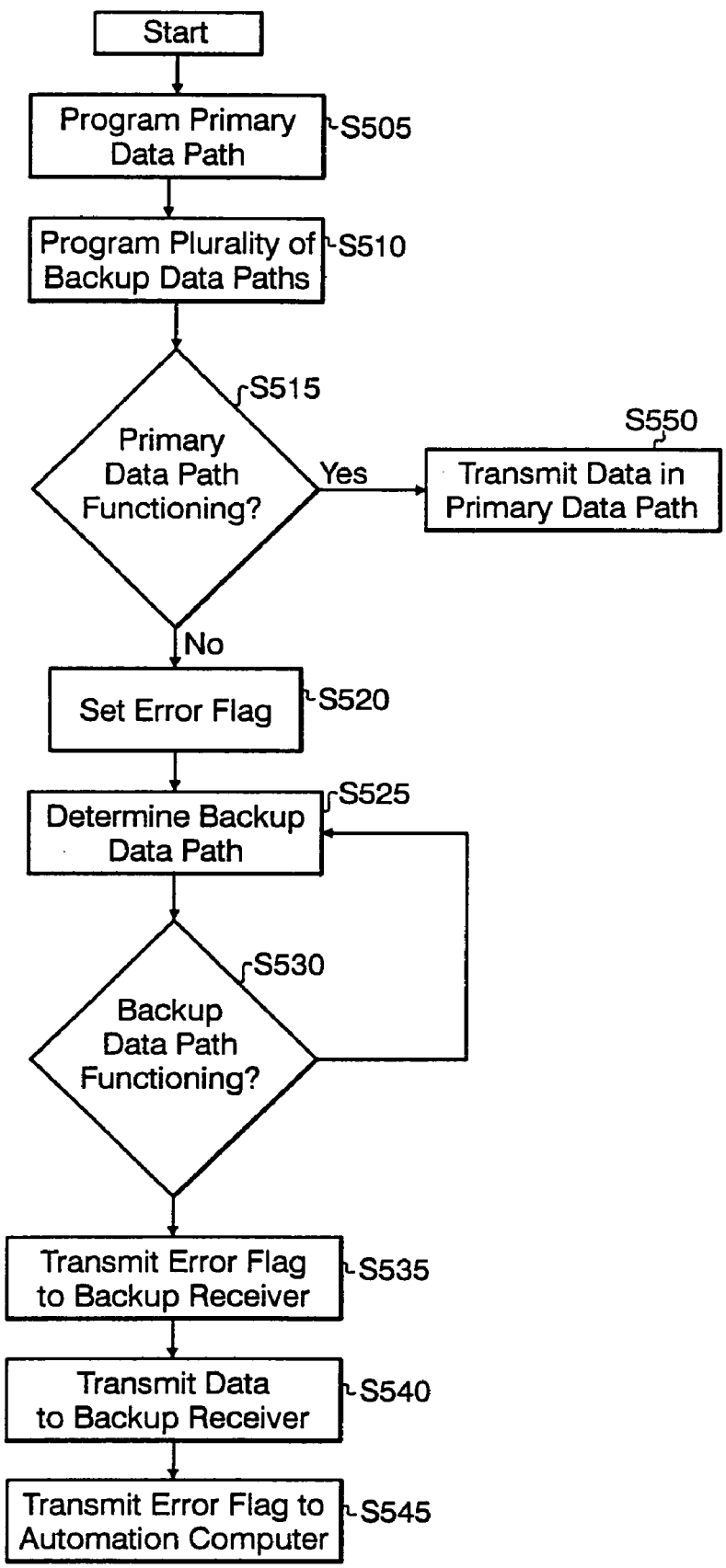
FIG. 4 illustrates the method according to an illustrative embodiment of the invention.

Next, the invention will be described as a sequence of steps to backup and redirect data in case of a malfunction. FIG. 4 illustrates the method according to an illustrative embodiment of a method of the present invention.

The process begins at S500. As explained above, the operator first must program at least one primary data path into the receiver at step S505. This will set the data path which the receiver 400 uses as a default. After the primary data path has been programmed and stored in memory 450, the operator will be prompted to enter at least one backup data path at step S510. The operator will select the backup data paths based upon a priority order in which the operator wants the control section 440 to check, when determining the backup receiver, i.e. first, second, etc. Once the proper configuration has been entered into memory 450, the receiver is ready to receive data from the local security systems 100. In another embodiment of the invention, the receiver would know automatically its primary data path and step 505 would be omitted and the process would proceed to step S510.

Upon receipt of data, the control section 440 determines if at least one primary data path is functioning, at S515. If at least one primary data path is functioning, the process proceeds to step S550, and transmits the data via the programmed primary data path. However, if the control section 440 determines that a malfunction has occurred, the control section 440 will set an error flag, at step S520. As explained above, the error flag can be an audible tone notifying the operator that an error occurred, a visible error signal and a control signal, which cause the data to be switched.

At step S525, the receiver 300 will determine which receiver has been assigned as the primary backup receiver and primary backup data path. The control section 440 will look in memory 450 to make this determination. Once the receiver 300 determines which other receiver is the backup, the receiver 300 will detect if that receiver is functioning. This is accomplished by determining if the backup receiver has its error flag set, at step S530.

If the control section 440 detects an error flag in the primary backup receiver, the process will proceed back to step S525. Step S525 and S530 will be repeated for each backup receiver and backup data path until the control section 440 determines that a backup receiver and data path are operational.

Once an operational back up receiver and data path is detected, the control section 440 will transmit its own error flag to the backup receiver corresponding to the operational data path at step S535. After the error flag is transmitted, the data received by the receiver 300 from the local security system 100 is transmitted to the backup receiver and eventually to the automation computer 230. At step S545, the error flag is transmitted to the automation computer 220 to notify the operator that an error has occurred in the primary data path of one of the plurality of receivers 210. The operator will be able to determine which receiver 300 has an error in the data path based upon the unique identification number attached to the error flag.

Figure 5:
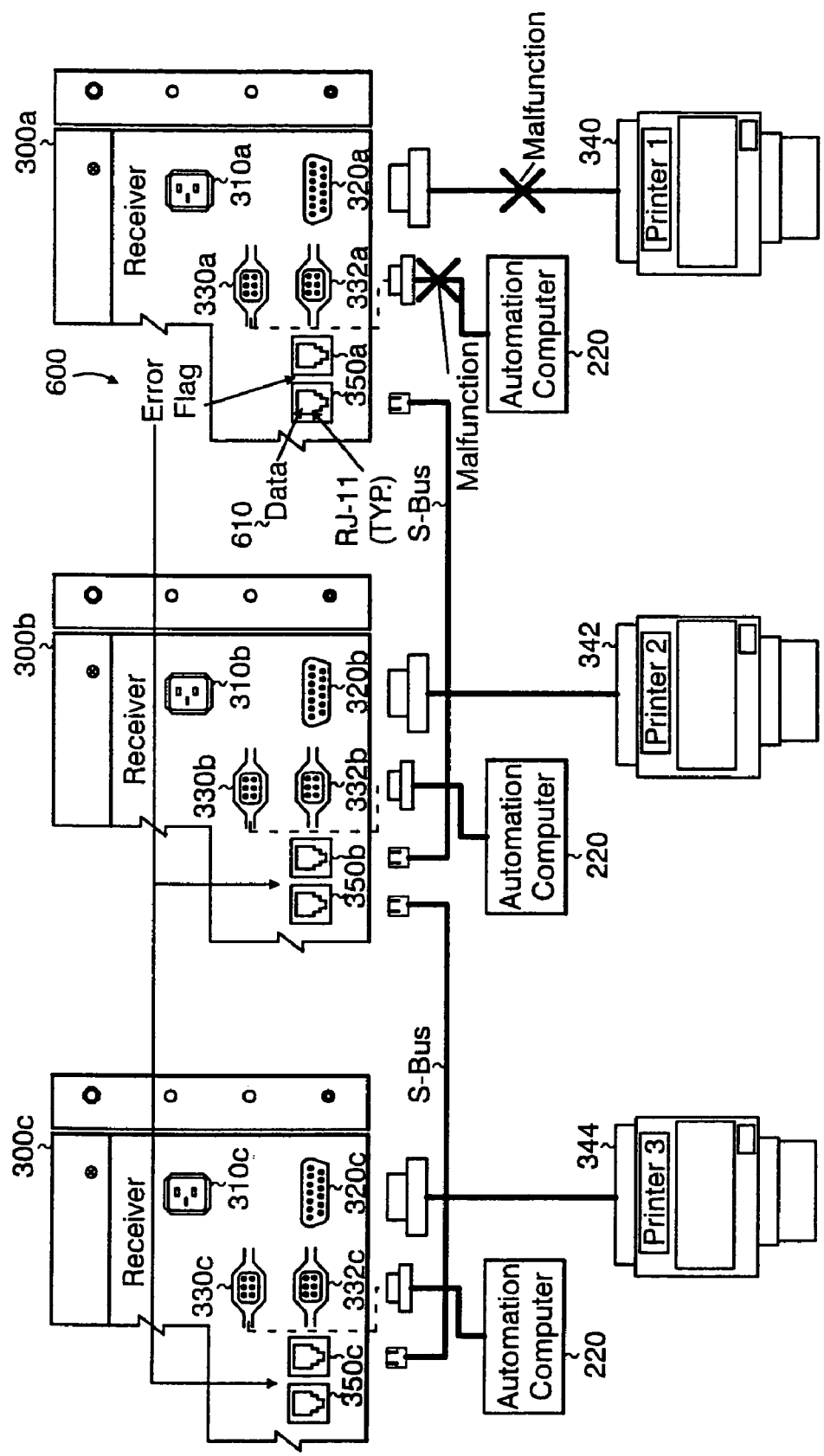
FIG. 5 illustrates an example of three receivers operating according to the invention when one of the connections to the automation system and printer are down.

FIG. 5 is an example of the operation of the invention according to the disclosed embodiment when one or more of the primary paths from a receiver 400 (either or both the printer path and automation computer path) is malfunctioning.

Specifically, the three receivers are interconnected using the connection port 350a, 350b, 350c. Receiver 300c and receiver 300b are both transmitting information normally through their primary paths to their printers 344 and 342 and automation computer 220 via the printer ports 320b and 320c and automation ports 330b and 330c, respectively.

However, at least one primary path for receiver 300a has been disconnected. Data received by receiver 300a cannot be transmitted using the primary path via the printer port 320a and the automation port 330a. Therefore, the primary backup receiver, either receiver 300b or receiver 300c automatically routes the data from receiver 300a through the connection port to receiver automation ports 330b and 330c and printer ports 320c and 320c, respectively, by detecting an error flag. The control section 440 detects this error and sets an error flag 600.

Prior to the redirection of the data, receiver 330a will have an error flag 600 set. The control section 440 will detect an error and set the error flag. The error flag can be an alarm tone notifying the operator that the primary path to the automation port is disconnected or malfunctioning. Additionally, this error flag 600 will be transmitted to the primary backup receiver. The error flag 600 will notify the primary backup receiver that at least one of the other receiver's primary paths is down and that the data needs to flow through the primary backup receiver as an intermediary to its printer and/or automation port. The error flag 600 will switch the flow of information of data 610 automatically to the backup receiver.

The error flag will also pass through to the primary backup receiver's automation port and to the automation computer 220 such that the operator of the system will be notified of the problem with the receiver.

If the primary backup receiver also has its primary path down to its printer and automation computer 220, then the data 610 will be redirected to the next available receiver with its printer port and automation port fully functioning. The next available receiver will be selected based upon the priority of backup assignments pre-selected by the operator.

Once at least one primary path to the automation computer and/or the printer is fixed and is up, the error flag 600 will be reset by the control section 440. The primary receiver will no longer transmit the error flag 600 to any of the backup receivers. The data will then automatically be switched such that the data 610 is transmitted to the printer and automation 220 computer via at least one primary path. For example, in FIG. 5, if the primary connection via the automation port 330a for receiver 300a is restored and/or the printer port 320a and printer 340 is fixed, the data 610 will be redirected back through receiver 330a and its automation port 330a. A restore message will be sent to the automation system indicating that the paths have restored (printer and/or automation).

The above description refers to an error in the primary data path which causes an error flag 600 to be triggered, however, any error in the printer, printer path, or in any connection between the receiver or automation computer will cause the error flag 600 to be triggered and sent to at least one primary backup data path.

The invention has been described herein with reference to a particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for controlling a flow of information received by a plurality of receivers in a monitoring system, said method comprising:
   programming at least one primary data path for each of said plurality of receivers;
   linking said plurality of receivers together to create at least one linked data path;
   programming at least one backup data path for each of said plurality of receivers using said at least one linked data path;
   determining the status of each primary data path for each of said plurality of receivers; and
   switching automatically from said primary data path to one of said at least one of backup data paths based upon said determining step.

2. The method of claim 1, wherein the step of switching automatically from said primary data path to one of said at least one of backup data paths occurs when there is an error in the at least one primary data path.

3. The method of claim 2, wherein the step of determining the status for each primary data path further comprises:
   detecting the error in the at least one primary data path; and
   setting a error flag based upon the detecting of the error.

4. The method of claim 3, wherein the error flag is displayed on a display of a receiver corresponding to the primary data path.

5. The method of claim 3, where the error flag is an alarm that notifies an operator of the error.

6. The method of claim 3, wherein the error flag is automatically transmitted to a backup receiver corresponding to one of said at least one backup data path.

7. The method of claim 3, wherein said error flag causes the switching from said primary data path to one of said at least one backup path.

8. The method of claim 1, further comprising the steps of:
   selecting a priority order for said at least one backup data path; and
   determining the status of each of said at least one backup data path.

9. The method of claim 8, wherein said determining step uses the priority order from the selecting step, as an order for determining the status of said at least one backup data path.

10. The method of claim 9, wherein the error flag and data is automatically transmitted to a receiver that corresponds to a first operational backup path based upon the determining of the status.

11. The method of claim 8, wherein the error flag is transmitted to an automation computer to notify the operator via one of said plurality of backup paths.

12. The method of claim 10, further comprising displaying the error flag on a display of a receiver corresponding to said first operational backup path.

13. The method of claim 1, wherein the primary data path is a connection between a printer and the receiver.

14. The method of claim 1, wherein the primary data path is a connection between an automation computer and the receiver.

15. A monitoring system comprising:
   a plurality of receivers, each of said receiver being connected to a plurality of local security systems;
   an automation computer connected to said plurality of receivers for processing data received by said plurality of receivers;
   a plurality of printers, each individually connected to one of said plurality of receivers;
   means for linking two or more of said plurality of receivers together such that data can be transmitted between each of said linked plurality of receivers;
   at least one primary data path for each of said plurality of receivers;
   at least one backup data path for each of said plurality of receivers;
   means for determining a status of each primary data path; and
   means for automatically switching from said primary data path to one of said at least one backup data path based upon the status of the primary data path.

16. The monitoring system of claim 15, wherein the switching automatically from said primary data path to one of said at least one backup data path occurs when there is an error in the at least one primary data path.

17. The monitoring system of claim 15, wherein the primary data path is a connection between the automation computer and a receiver.

18. The monitoring system of claim 15, wherein the primary data path is a connection between one of said plurality printer and the receiver.

19. The monitoring system of claim 16 further comprising:
   means for detecting the error in the at least one primary data path; and
   means for setting a error flag based upon detecting the error.

20. The monitoring system of claim 19, wherein the error flag is displayed on a display of a receiver corresponding to the primary data path.

21. The monitoring system of claim 19, wherein the error flag is an alarm that notifies an operator of the error.

22. The monitoring system of claim 19, wherein the error flag is automatically transmitted to a backup receiver corresponding to one of said at least one backup data path.

23. The monitoring system of claim 19, wherein said means for automatically switching includes said error flag.

24. The monitoring system of claim 15, further comprising a means for determining the status of each of said at least one backup data path and means for selecting a priority order for said at least one backup data path.

25. The monitoring system of claim 24, wherein an order of selection of one of said at least one backup data paths for status is based upon the priority order of said at least one backup data path.

26. The monitoring system of claim 25, wherein the error flag and data is automatically transmitted to a receiver that corresponds to a first operational backup data path based upon the determining of the status.

27. The monitoring system of claim 26, wherein the error flag is transmitted to an automation computer to notify the operator via one of said plurality of backup paths.

28. A monitoring receiver system comprising:
   means for linking a plurality of receivers together to create a linked data path, data can be transmitted between each of the linked receivers using a portion of the linked data path;
   means for selecting, for each of the plurality of receivers, a portion of the linked data path as a primary data path;
   means for selecting, for each of the plurality of receivers, another portion of the linked data path as an at least one backup data path;
   means for determining a status of each primary data path; and
   means for automatically switching from the primary data path to one of said at least one backup data path based upon the status of the primary data path.

* * * * *